United States Patent [19]

Nordal

[11] Patent Number: 5,384,764
[45] Date of Patent: Jan. 24, 1995

[54] DATA STORAGE MEDIUM AND METHOD FOR RECORDING AND READING OF DATA

[75] Inventor: Per-Erik Nordal, Nesbru, Norway

[73] Assignee: Dyno Particles A.S., Lillestrøm, Norway

[21] Appl. No.: 930,383
[22] PCT Filed: Jan. 17, 1991
[86] PCT No.: PCT/NO91/00006
  § 371 Date: Sep. 9, 1992
  § 102(e) Date: Sep. 9, 1992
[87] PCT Pub. No.: WO91/11804
  PCT Pub. Date: Aug. 8, 1991

[30] Foreign Application Priority Data

Jan. 31, 1990 [NO] Norway ................ 900443

[51] Int. Cl.⁶ ............................ G11B 7/013
[52] U.S. Cl. ............... 369/275.1; 369/275.1; 369/200
[58] Field of Search ........... 369/108, 109, 125, 275.1, 369/275.2, 275.4, 275.3, 277, 273; 359/619–628

[56] References Cited

U.S. PATENT DOCUMENTS

| | | | |
|---|---|---|---|
| 4,025,159 | 5/1977 | McGrath | 156/272 |
| 4,200,875 | 4/1980 | Galanos | 346/76 L |
| 4,284,716 | 8/1981 | Drexler et al. | 430/510 |
| 4,542,288 | 9/1985 | Drexler | 235/487 |
| 4,600,682 | 7/1986 | Spong et al. | 430/270 |
| 4,807,218 | 2/1989 | Gerber | 369/100 |
| 4,811,326 | 3/1989 | Gerber | 369/275.1 |
| 4,811,331 | 3/1989 | Gerber | 369/275.4 |
| 4,841,515 | 6/1989 | James | 369/275.2 |
| 4,852,077 | 7/1989 | Clark et al. | 369/286 |
| 5,175,725 | 12/1992 | Tinet | 369/109 |

FOREIGN PATENT DOCUMENTS

| | | |
|---|---|---|
| 0219012 | 4/1987 | European Pat. Off. . |
| 0273691 | 7/1988 | European Pat. Off. . |
| 3634865 | 6/1987 | Germany . |
| 864041 | of 0000 | Norway . |

Primary Examiner—Paul M. Dzierzynski
Assistant Examiner—Don Wong
Attorney, Agent, or Firm—Wenderoth, Lind & Ponack

[57] ABSTRACT

An optical data storage medium with burn-film having changeable optical properties, for example, changeable reflective power as a result of sufficiently intense illumination, due to hole-burning in the film, is provided with optical structures close to the burn-film for focusing and positioning during recording and reading of individually interpretable data bits (spots). The optical structures are preferably monodisperse, transparent spheres with a diameter in the range of 1–100 μm. Illumination is performed selectively from a number of predetermined angles ($\Theta_i$, $\phi_j$) during recording and reading, and the number of individual data spots under each sphere corresponds roughly to the number of angles.

31 Claims, 11 Drawing Sheets

PROXIMITY MODE

OPTICAL FIBER MODE

IMAGING MODE

DATA STORAGE MEDIUM AND METHOD FOR RECORDING AND READING OF DATA

BACKGROUND OF THE INVENTION

The present invention relates to an optical data storage medium and to methods for recording and reading data on/from such medium.

More specifically, a concept is described for optical storage of information on data carriers such as fiches, cards or tape.

The data carrier's surface is completely or partly covered with focusing microstructures adjacent to a layer which is able to change its optical properties when exposed to intense light. (In the following, this layer will for simplicity in most cases be referred to as the "burn-film". This expression does not imply any particular embodiment of the layer, which can be of the reversible or the irreversible type, as discussed below.) During recording of data, local changes are created in the layer by having the microstructures focusing the light, thus obtaining a high light intensity on the layer. During reading of data, the optical microstructures may operate as an active optical component assisting the reading equipment.

By using e.g. transparent microspheres (typical diameter: 1 to 100 μm) as focusing elements disposed over an optically absorbing film, a tight focusing and a high data storage capacity can be achieved without the complexity and the expenses that otherwise would be required for a recording and reading system which focuses directly on the light absorbing layer. Using oblique illumination through the microspheres, possibilities arise for storage of a high number of data bits at each microsphere position, as well as for hierarchically built data bases, in certain cases combined with data protection. Easy prerecording on mass produced data carriers becomes possible. During reading of data the microspheres function as auxiliary optics, which makes it possible e.g. to read large blocks of data without the use of a laser.

Storage of data by means of laser beams which produce local change of the optical properties of a thin film on a planar substrate are well known, for example from SPIE vol. 329 (1982), SPIE vol. 490 (1984), SPIE vol. 695 (1986), SPIE vol. 899 (1988), SPIE vol. 1078 (1989). The change in optical properties can be reversible, whereby the stored data can be deleted and replaced by new data.

Alternatively, the change in optical properties can be irreversible, whereby it becomes impossible to delete and/or rerecord new data. Storage media of the latter type are often referred to as WORM (Write Once Read Many Times) media.

A usual method of preparation of WORM media consists of depositing on the substrate, which is a plastic disc, a thin film of a low melting point metal such as Te. During data storage each bit is represented by the physical status of the specific film area assigned for the storage of said bit (one elementary data storage cell with its address), i.e. whether that area has been irreversibly changed due to exposure to light or whether it is unchanged. According to present knowledge, all practical optical data storage systems are so far based on reflection from the burn-film. The irreversible change consists in such a case of an increase or a decrease of the reflectivity of each cell when a focused laser beam heats the burn-film. In the film is thereby created a hole through which the light can pass, or the film is smoothened so that its reflectivity increases. Several other processes can be used, e.g. local deformation of the substrate which influences the reflectivity. Reading is most commonly performed by examining the reflectivity of each cell by means of a focused laser beam scanning the surface of the data carrier systematically. This laser beam is too weak to influence the reflectivity.

From NO patent application 86.4041 (=DE 35 36 739)a data storage medium of the optical type is known, which medium is equipped with focusing optical structures integrated in the medium together with and on top of a material the optical properties of which can be changed by irradiation with light. This known data carrier is however only adapted for storage of visible data, i.e. images which are visually perceptible and which consist of spots that are to be interpreted together in order to create an image. "Tilt-images" can be created due to the optical structures, i.e. a lens raster or array, because the lenses are able to direct light to defined small areas underneath the lenses, depending on the direction of illumination. The lenses are however, relatively large, the range of variation of the lens diameter is indicated to be 150-500 μm, recommended about 400 μm. Thus, the technique described does not relate to a data storage medium for optimized "close packing" of e.g. digital, independently interpretable data bits, but only a spot-structured image storage of the directly visible type. Only irreversible recording of data is described in NO patent application 86.4041.

A main objective for the use of optical data storage media instead of magnetic ones is the very high storage density which can be achieved, combined with good long-time stability (e.g. immunity against magnetic fields). Optical data storage is however subject to both fundamental and practical limitations, and a trade-off must be made between different desired features, of which the most important are:

1) Large number of stored bits per unit area
2) Low laser energy for recording of each bit
3) High contrast when reading information
4) Fast recording and reading
5) Short "random access" time
6) Robust and stable data storage medium
7) Inexpensive data storage medium
8) Inexpensive recording and reading equipment
9) Moderate requirements for precise focusing (distance control)

Today's techniques have various limitations/problems. Consider first the recording and reading systems: If a high data storage density is desired it is necessary to use for data recording a laser beam which is focused on the burn-film by means of very high speed optics (lens with low f-number). Theoretically, the light beam can under optimum conditions be focused to a diameter of about the wave length of the light which is applied. Practical systems have been realized which come very close to that, with focal point diameters of 0.5-1 μm. However, under such strong focusing the requirements for the mechanical control of the lens become very strict.

Lens to burn-film distance must be controlled precisely: On either side of the focal point the laser beam diverges very quickly and in a distance of z/2 from the focus the diameter is doubled (provided a Gaussian light beam, see FIG. 1). z can be interpreted as a measure of "depth of field" which is correlated to the beam diameter w at the focal point and the light wave length $\lambda$ by the equation:

$$z = \pi w^2 / \lambda \qquad (1)$$

Since w is very small in this connection, z lies only in the range 1–10 μm, which means that the distance between lens and storage medium must be controlled with corresponding precision. Possible deviations from planarity in the data storage medium and variations in the optical thickness of the protective film covering the burn-film, entail that the distance in practice must be servo-controlled during the fast relative movement between storage medium and lens.

Furthermore, the position of the burn-film is critical. When storing data on rotating discs, the burn-spots are typically positioned in a spiral pattern or in concentrical tracks, or in straight stripes when storing on cards. In both cases, the burn-spots must be placed as close to one another as possible in order that a high storage density be achieved, a typical distance between spots being from a few μm down to approximately 1 μm. The requirements for the positioning of the lens become correspondingly stringent and imply in practice that the data storage medium beforehand has received optical "guide-tracks" which can be followed during recording and reading by a control servo.

During the reading of data, corresponding fundamental limitations apply as during recording: In order to be able to detect the small burn-spots and to discern them from one another, the use of either a laser beam with focusing properties and positioning as mentioned above for recording is required, or an imaging system. In the latter case the resolving power requirements imply that the lens must be positioned with a distance precision corresponding to the one which applies when a laser beam is used.

To summarize: Recording and reading systems which operate with burn-spot diameters of approximately 1 μm or less require in practice a laser as a light source, optical components of high quality, sophisticated mechanical control-systems as well as data carriers with well controlled mechanical and optical properties (cf. below). With regard to commercial competition, this probably has little consequence for larger stationary units in controlled environments, but it may represent a considerable handicap for small, possibly mobile recording and reading units, particularly in difficult environments (vibrations, dust, etc).

The data storage medium itself is also encumbered with limitations and problems: A potential disadvantage of small burn-spot sizes lies in a possible interference of recording and reading due to small dust particles 2 or the like. In principle, this problem can be solved by depositing a transparent protective film 3 onto the burn-film 4, see FIG. 2. Provided that the protective film 3 is thick enough, the laser beam 1 due to its strong focusing, will have such a large diameter on the surface of the protective film 3, that small particles 2 only obscure a small part 6 of the beam 1. This however, requires high quality of the optical properties of the protective film. A general requirement exists for flatness and refractive index constancy in order to avoid focus displacement. This requirement becomes more severe in the case of small burn spots. Thin and flexible data carriers like optical tapes, fiches or cards represent a particularly big problem. The necessary stiffness/flatness can not be built into the data carrier itself, and shadowing effects from (dust) particles cannot be appreciably reduced through focusing as shown in FIG. 2. For recording and reading on/from data storage systems which are based on measuring light reflected from the burn-film, it is usual to apply polarisation sensitive beam-splitters. This means that a protective film in addition to being homogenous, etc., also has to be free from double refraction. This excludes large groups of materials which otherwise would have been eligible e.g. rolled or extruded plastic foils.

Reading by means of reflection from the burn-film requires in addition that it posesses a not insignificant reflection capability. Since the film at the same time must be able to absorb enough radiation during the recording phase, the choice of film material and film thickness is significantly restricted, and a sufficiently good control of reflection/absorption during the production process must be taken care of.

In order to avoid the above mentioned problems and to achieve adaption to special market niches, optical data storage systems have been introduced, based on relatively large burn- spots, i.e. 2.5–25 μm in diameter. In U.S. Pat. No. 4,542,288 and U.S. Pat. No. 4,284,716 Drexler et al. describe an optical data carrier of credit card size, where burn-spots are recorded along a series of straight tracks on a foil with burn-film which is bonded to the card. The burn-spot size is typically from 2.5–7 μm and upwards in diameter, with a distance of 12 μm between the burn tracks. This leads to a significantly lower data storage density than described in the above introduction, and the capacity of the card is thus only 2–4 megabytes. On the other hand, recording and reading become relatively uncritical, and it becomes possible to employ, e.g. an incoherent light source (light emitting diode) for reading. It is intended to introduce optical data cards which are rigid and inexpensive enough to have user characteristics comparable to ordinary credit cards.

A potential problem associated with large burn-spots is the required heating of considerably larger areas by the laser during recording: For example, changing the burn-spot diameter from 0.7 μm to 7 μm leads to an increase of the spot area by a factor of 100. In order to avoid a dramatic and unacceptable increase in the requirements for the laser power or pulse energy, it is therefore necessary to lower the recording threshold of the burn-film (threshold for controlled thermal damage during exposure to laser light) considerably in relation to what is acceptable in stronger focused systems. Drexler et al. have developed a burn-film consisting of silver microparticles in gelatin, which, through chemical treatment, reaches an optimized surface reflection and has a very low recording threshold.

Even though Drexler et al. by use of their special burn-film and the large burn-spot area have achieved technical solutions which are suited for large and important markets, this has resulted in a lowered data storage capacity, which lies approximately two order of magnitude below other optical data storage systems. At present, data storage applications seem to have been targeted that can be met within the 2–4 megabyte capacity of this card limit (e.g. patient journals), but there is no doubt that this low data storage density in the future will be considered as even more limiting and unacceptable, also with regard to small and distributed data systems. Finally, it is until now unclear to which extent the highly sensitive and chemically special burn-film may have poorer stability when exposed to strong influences from adverse environments (heat, light, chemical attacks) than burn-films made from e.g. tellurium.

SUMMARY OF THE INVENTION

A main objective of the present invention is to provide an optical data carrier and methods for recording and reading which, in spite of high data storage density, impose modest requirements upon the recording and reading equipment with respect to power and precision.

This object is achieved according to the invention by manufacturing an optical data storage medium of particular type defined below and by employing data recording and reading processes as defined below.

DESCRIPTION OF THE DRAWINGS

The invention shall now be further described by means of examples and with reference to the accompanying drawings, wherein:

FIG. 5B show burn holes formed in a line, and FIG. 5C shows a pattern expanded in to dimensions.

DERAILED DESCRIPTION OF THE INVENTION

By incorporating focusing structures into the data storage medium, the same advantages can be achieved as when applying large burn-spots, without the need to reduce the high data storage density. At the same time possibilities for technical solutions and applications are accessible, which are not within reach with traditional data storage media.

Figure 1:
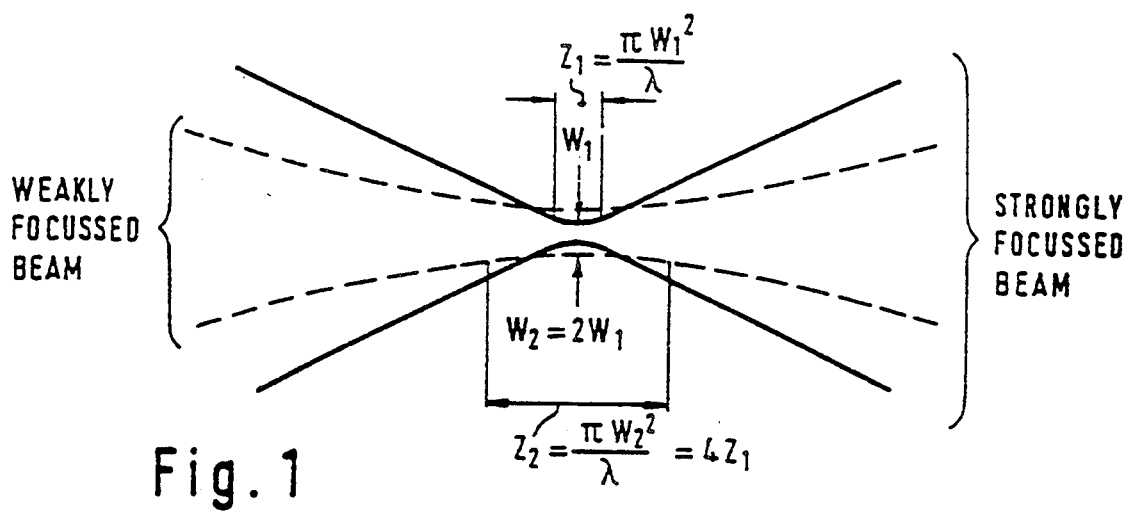
FIG. 1 shows schematically the basic relationship between the degree of focusing and the depth of field as described above.
Figure 2:
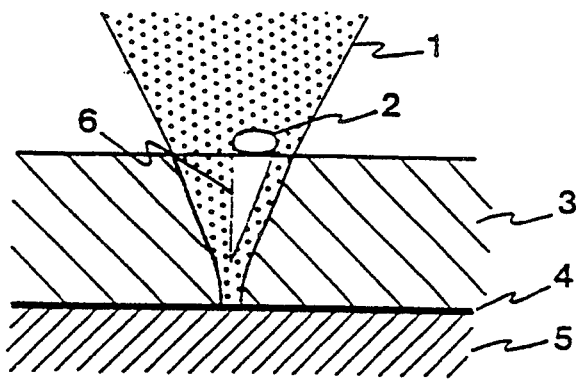
FIG. 2 shows how a protective film on top of a burn-film reduces the influence of impurities or defects on the surface as described above.
Figure 3:
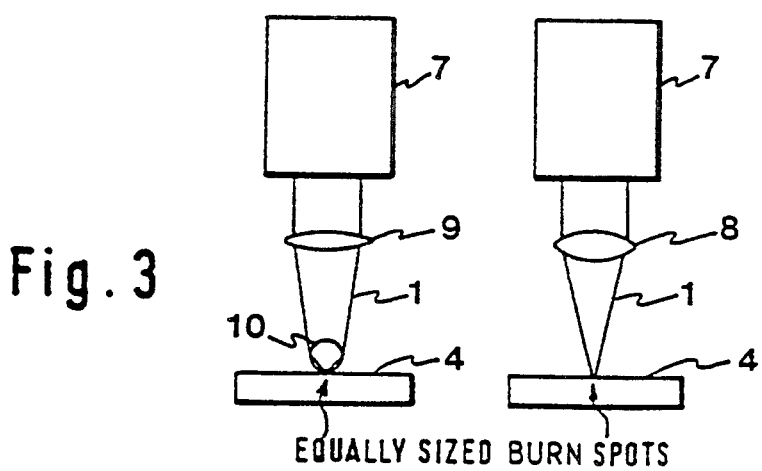
FIG. 3 illustrates the effect of optical structures such as transparent spheres over the burn-film, compared with traditional set-ups.

FIGS. 2 and 3 (left part of FIG. 3) show schematic drawings of a memory medium according to this invention: A carrier layer 5 of e.g. plastic is coated with a thin burn-film 4, which is covered with microlenses (10), e.g. small, transparent spheres which are spread on top of the film 4 or adjacent to it, preferably in a certain pattern. During recording of data a light beam 1 from a laser 7 is directed toward one sphere 10 at a time; the beam 1 only having to be sufficiently in focus to hit single spheres 10. The light is thereafter focused in the actual sphere 10 and illuminates a small spot of the burn-film 4 underneath the sphere 10, which causes a change of the optical properties of the burn-film 4 at this spot, e.g. a hole is created in the burn-film (a "burn-spot") through which light can pass. The presence or non-presence of a burn-spot represents one information bit (logical "0" or "1"). The medium's role in including "auxiliary optics 10" is illustrated in principle in FIG. 3, through the comparison with a traditional medium (right part of FIG. 3) without microlenses, where a powerful lens 8 must be used. It shows that small burn-spots with corresponding low power/energy requirement for the laser beam can be combined with relatively large spheres 10 and corresponding uncritical focusing (low power lens 9), and positioning of the beam 1.

The problem still remains, that large spheres 10, in analogy with large burn-spots, as mentioned above, give low data storage density as long as only one burn-spot relates to each sphere. However, by illuminating the spheres 10 from other directions, burn-spots will occur at many points 11 underneath one given sphere 10, i.e. formed by each sphere 10 is a group of localized areas or burn spots, see FIG. 4. Writing of burn-spots 11 by illuminating at skew-angles thus enables each sphere 10 to store several bits, depending on how many burn-positions can be assigned to each sphere. When each sphere 10 has the coordinates x, y in the plane, and the skew-angle is defined by the polar-coordinates $\Theta$, $\phi$, the complete address of each bit-position on the storage medium can be written (x, y, $\Theta$, $\phi$). The number of possible burn-directions ($\Theta_i$, $\phi_j$) for each sphere 10 can be interpreted as a "multiplex factor" N. Present experiments indicate practically achievable values for N up to 25, possibly more.

Figure 5A:
FIG. 5A shows experimentally produced burn-patterns achieved through the use of transparent spheres.

FIG. 5A shows an example of an experimental born pattern where light has been sent through a large number of spheres in the same way using five different angles in the same plane. The corresponding burn-holes in the film are formed in line as shown in FIG. 5B (one burn-hole is weaker than the rest, due to an unintentionally less intense laser beam), with good individual definition. This result shows that it is possible to produce under each sphere, for example, a group of approximately 17 well defined burn-holes as shown in FIG. 5C (2 Bytes plus control hole, see below).

Each group and localized area can be read individually and has no inherent relation with neighboring groups or areas. Reading consists in determining the addresses which have a burn-spot, which implies determination of the local change of the optical reflection or transmission properties of the burn-film. Principal and technical aspects in connection therewith will be discussed in the following.

Figure 4:
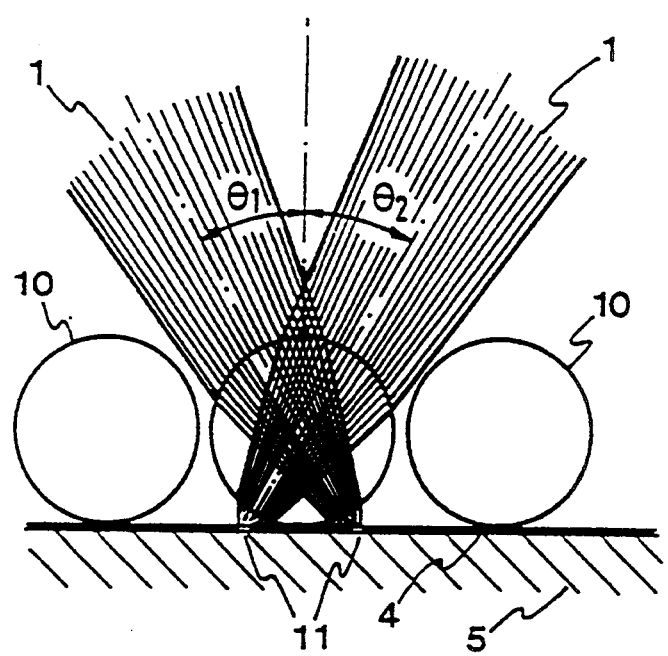
FIG. 4 shows in more detail how a hole can be created in the burn-film in various positions underneath one single transparent sphere by varying the direction of the incident light beam.
Figure 4:
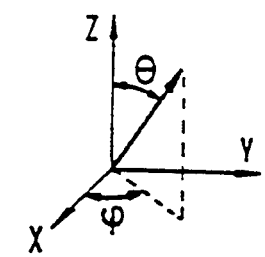

The focusing microstructures can have many forms: Light-refracting structures 10 may be placed in front-/on top of the data storage film 4 as shown in FIG. 4, or can be different types of variations in the structure or transparent film positioned in front/on top of film 4, i.e. on the side thereof from which medium is illuminated. Such variations can include e.g.:

- Discrete optical elements, immobilized in relation to the data-storage-film 4 (spheres, convex lenses, Fresnel structures).
- Stamped or otherwise formed surface patterns of a mechanical geometric character in the transparent layer.
- Controlled refractive index variations in the completely or partly transparent layer, such index variations produced e.g. by incorporating additives, in controlled concentrations and positions by means of semiconductor doping techniques, i.e. diffusion or ion implantation.

Figure 6:
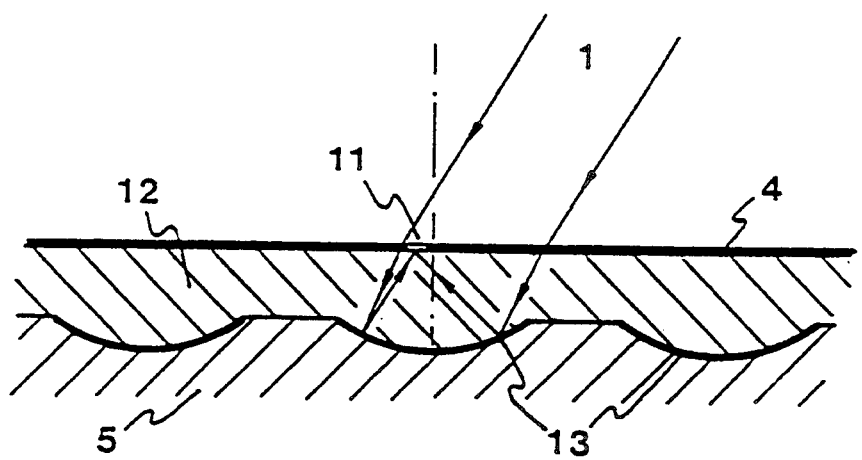
FIG. 6 shows an alternative type of optical structures, i.e. reflecting microstructures under the burn-film.

Light reflecting structures 13 may be variations in a film behind/under the data storage film 4, so that the light 1, after passing through the film 4 (assumed partly transparent) and a transparent layer 12, is reflected and focused by variation 13 of the reflecting film against the film backside, see FIG. 6.

The burn-film 4 can be of the irreversibly changeable type, or it may be reversible if different light intensities are applied for recording, erasing and reading. Reversible optical burn-materials are known for example from the article "Organometallic materials for erasable optical storage" by Hoffman and Potember, Applied Optics, vol. 28, p. 1417–1421, 1989. Other, well known reversible burn-films are of the type magneto-optical, phase-changing, blistering, among others.

Figure 7:
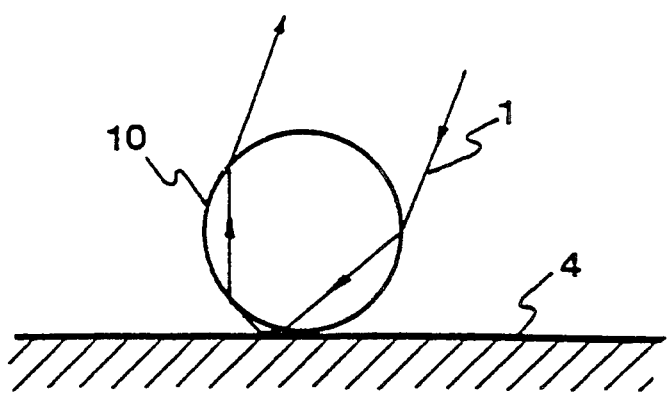
FIG. 7 illustrates retro-reflection from the burn-film by means of a transparent sphere.

Two main alternatives exist for reading of data from the data storage medium, namely measuring the light that is reflected from the medium, or the light that is transmitted through it:

Reflection: A laser beam 1 scans the addresses of interest on the data storage medium. The illumination of the spheres 10 is performed under the same conditions as during recording, but the beam intensity is now adjusted so that it is too weak to affect the burn-film 4. In a properly designed data storage medium, the light that is reflected from the burn-film 4 hits the sphere 10 from the bottom side and is focused in such a manner that the light returns in the direction from which it entered (FIG. 7). The reflected light can be separated from the incident light beam by means of a beam splitter, and the intensity is measured by a photodetector. This is a well known technique which is used in a majority of existing optical data storage systems. At addresses with a burn-spot, the reflection becomes weaker (stronger for some types of burn-films) than otherwise, whereby the logical state "0" or "1" of each single address is determined.

Figure 8:
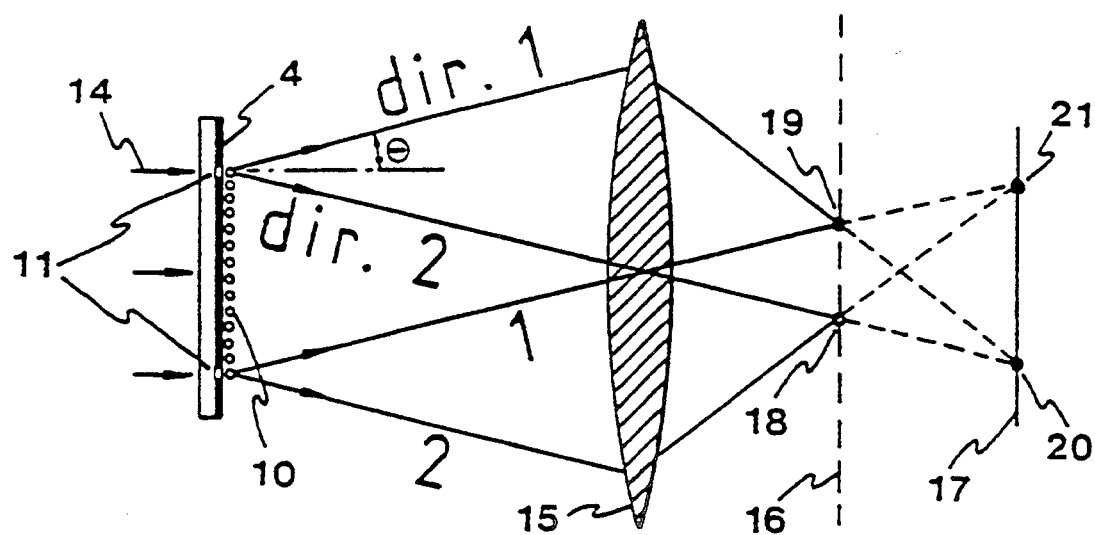
FIG. 8 is a schematic drawing showing the principle of a reading method where diffused light is applied from the bottom side of the data storage medium.

Transmission: In this case, light is only allowed to pass through the burn-film 4 in positions where burn-spots 11 exist. In analogy with the reflection case, the addresses of interest can be scanned with a laser beam, while at the same time recording through which ones light passes to a photodetector which is placed on the back/bottom (in the following the front/top is defined as the side where the spheres 10 are placed). The special data storage media disclosed here, however, permit new and in many cases very simple reading methods to be used. Two concepts are described in the following; in one case illumination is provided from the back, in the other case from the front:

Under "Spatial filtering in the Fourier plane" (see FIG. 8) the data storage medium is illuminated with a broad, diffuse light beam 14 from the back. The light source can be for example a lamp or a light emitting diode. Each burn-spot 11 then acts as a light source under each sphere 10, with a position in relation to the sphere which causes the light after passing through the sphere to follow the direction which the laser beam had during recording. Address determination is effected in two steps: a lens 15 first focuses the illumination in one plane 16 (Fourier plane) where light from all burn-spots 11 which were recorded under a given direction ($\Theta$, $\Phi$) passes through the same point 18 or 19, characteristic for that burn-direction (direction 1 or direction 2). Thereafter, the light which passes through each of these characteristic points 18, 19 is separated by means of a hole mask (e.g. time controlled electro-optically), mirror or the like. For each light bundle an image 20,21 of the data storage medium will be created in a plane 17 behind the Fourier plane, where burn-spots 11 which were recorded in a given direction ($\theta$, $\phi$) appear bright against a dark background. The surface position (x, y) on the area can thereby be determined by means of one or more photo detectors. In this manner a complete address-set (x, y, $\Theta$, $\phi$) can be obtained for each direction ($\Theta_i$, $\phi_j$) which is accessible for data storage in the given medium.

An alternative reading method may be termed "directional illumination", where the data storage medium is illuminated from the side where the spheres 10 are located. Only light 14 with an angle of incidence towards the spheres 10 corresponding to one of the directions which were applied during recording, will be able to pass through a burn-spot 11, see FIG. 9A. By illuminating a larger area of the data storage medium using the angle of incidence ($\Theta_i$, $\phi_j$), it becomes possible to determine from the backside of the medium those burn-spot positions (x, y) on the medium which have this direction in their addresses. This is illustrated in FIG. 9B, where a group of four holes has been burned under each one of some neighbouring spheres. As shown, it is possible by means of directional illumination to have the light pass selectively through holes which correspond to each of the four burn-directions. By systematically illuminating in all accessible burn-directions, it is therefore possible to determine the logical state "0" or "1" for complete address sets (x, y, $\Theta$, $\phi$). FIG. 9B specifically shows read-out using directional illumination. The center picture shows burn-holes in a square pattern, no illumination and burning angle of 10° from perpendicular, with sphere diameter of 20 $\mu$m. The reading pictures show sequential read-out along the four burn directions.

During recording and (in certain cases) reading, the laser beam has to be positioned and oriented at such an angle that each single sphere is struck correctly. In analogy with today's optical data storage techniques, this might be achieved with a system that directs a weak (which means not intense enough to affect the burn-film) laser beam to the desired address by means of an optical control track or guide in the burn-film.

These tracks or guides must have an unequivocal spatial relationship to the sphere positions, and could have higher or lower reflectivity than the rest of the burn-film. Alternatively, one can make use of the fact that the spheres are immobilized in relation to the burn-film, in a pattern that can serve as a coordinate reference in the plane. Provided that the burn-film is sufficiently reflecting, the modification of the weak laser beam reflection when the beam strikes the spheres could be applied as guidance criterion.

One disadvantage of such techniques is, that they are not applicable for systems based on light that is transmitted through burn-spots in data carriers. As far as now known, reading by reflection is the only method employed with optical data storage systems which are at present on the market. In U.S. Pat. No. 4,542,288 Drexler claims that data storage on reflecting media is advantageous because, e.g. automatic focusing is easier to implement. This is not surprising, since the burn-film does not allow light to pass through.

In the present case, however, optical guide marks can be established in a very simple manner, and these marks can be applied in both reflection and transmission based systems. After the data storage medium has been manufactured, it is exposed to a strong light flash from a laser or a flash lamp which exposes a large area of the data storage medium simultaneously. The light strikes the plane where the spheres are deposited in a direction perpendicular to the plane, and the intensity is controlled such that changes in the burn-film only take place in a small area in the center under each sphere. The sphere's lens effect thus causes a small, well defined burn-spot to be made, similar to burn-spots which are obtained during laser recording of data (laboratory experiments have shown that this is relatively easily achieved). Burn-spots created during the light flash are thereby automatically positioned correctly each in relation to its sphere. At spheres that are located somewhat off their nominal position, the burn-spot is formed correspondingly displaced. If a sphere were lacking in a given position on the data storage medium, no positioning burn-spot would be formed at that point.

In data storage media where the burn-spot is a hole in the burn-film through which light can pass, it is possible to create, e.g. by illumination of the medium from the opposite side of the burn-film, a well defined light source related to each sphere, which can be used for automatic positioning and focusing during recording and reading of data.

It should be pointed out that the optical control mark need not necessarily be located centrally under each sphere, but can be achieved with oblique illumination. It can be of advantage that certain data are recorded before a user starts the first recording. When the data storage medium is delivered to the user, it is as mentioned above, typically equipped with optical control guides for focusing and positioning of the recording and reading systems. Also, various other types of information may have been stored, for example, address or control codes.

Elementary pre-recorded information of that type becomes common to all users of a certain type of optical data storage medium, for example one category of data card. However, in addition it may be of interest for many users to prerecord user specific information which is duplicated on a great number of identical cards. Such users may be organizations, insurance companies etc., which wish to store expiration data, user codes or the like on cards that are sent to members as the end users. Alternatively, it may concern data programs, etc. which are distributed in great numbers etc.

In principle, recording of such information is possible with standard equipment for recording, which either is used directly or is modified with respect to automatic handling of the cards. This may, however, become very time consuming and may be expensive. The number of cards to be prerecorded can be very large (from thousands to millions), and in certain cases it will at the same time be of interest to store considerable amounts of data (e.g. data programs) on each card.

On this background it is desirable to have a cheaper and more efficient alternative to standard laser recording. As far as is known, there exists at present in the technical and scientific litterature no technical solution to this problem. Admittedly, Drexler discloses in U.S. Pat. No. 4,542,288 pre-recording of data on cards by means of photolithography, laser recording or surface molding. However, this has to be done before the card is sealed and sent to the users, and is in most cases probably limited to simple basic information as discussed above.

A seemingly simple alternative is to apply a masking technique in analogy with the light exposing step in photolithography: A mask which has holes where burn-spots are desired, is placed over a data storage medium and in register with it (which means, the mask is placed with the holes in correct position in relation to the data storage medium). The data storage medium is then illuminated through the holes in the mask thereby obtaining burn-spots in the right places. However, two problems arise.

First, the light's wave nature causes it to spread fan-like behind the holes, and the shadow pattern becomes blurry. The deviation from the geometric shadowing increases, the smaller the holes, and the larger the distance from the shadowing mask. Practical optical data storage media are typically equipped with a protective film of 150–500 µm in thickness. This means in practice that recording through a mask on media that have been through the complete manufacturing process (i.e. are covered with protective film) cannot be performed by means of a mask-technique as long as the burn-spot size is supposed to stay well below approximately 4–8 µm in diameter. Thus, all present data storage media are excluded, with the possible exception of media with particularly low data storage density. As far as is known, only Drexler Technology Corp.'s Lasercard may be of relevance in this connection.

The other problem is less fundamental, but of great practical and economic importance. Reading of data requires that the light intensity and the pulsation energy are sufficiently high at the point where the burn-spot is to be created. When using the mask technique a large area (which means the whole mask) is exposed simultaneously and the light source must be sufficiently intensive over that complete area. This can mean that instead of a flash lamp a relatively strong laser beam may be required, which easily can become a dominating and prohibitive cost element in recording equipment, intended for markets. where users are numerous, each with their own equipment ("distributed users"). In the present invention these problems are circumvented:

First, only light spots of the size of the focusing optical structure need to be defined during illumination through the mask. The dimensions of the structures and the thickness of the protective film are adjusted to each other, while simultaneously a high data storage density is maintained by applying many directions for recording and reading, as discussed before.

Second, the structures (e.g. spheres) collect light energy over a large part of their cross section and concentrate it in a considerably smaller area (burn-spot). Thereby the power/energy requirements of the light source are reduced.

The focusing micro-optics (e.g. spheres) in the data storage medium itself may thus be viewed as an integral part of the optical reading and recording systems. Micro-optics can have an "assisting role" so that the requirements for the remaining optical and mechanical system components can be reduced, but they can also lead to qualitatively new possibilities in optical data storage. In the following both types of advantages/possibilities are shortly summarized:

a) High data storage density combined with an uncritical positioning and focusing during recording and reading:

Not the burn-spots, but the considerably larger focusing optical structures (spheres) define the optical and mechanical requirements for the recording and reading equipment. This leads to an increased depth of focus and lower requirements for positioning with subsequent simplifications and cost reductions for recording and reading systems, as well as for the data storage medium itself (planeness, etc.).

In typical difficult environments, an optical data storage system based on integrated optical structures (e.g. spheres) in the data storage medium will be less critical and tolerate more vibrations, temperature changes and other physical disturbance parameters. This can be of importance in airplanes and for military use.

b) Possibilities for prerecording of data by means of mask technique, cf. above:

Each optical Structure, e.g. sphere, on a data storage medium which is to be illuminated selectively through holes in the mask, is so large that diffraction-effects behind the holes can be tolerated. This includes practical media with a protective film. At the same time, the structures collect light from an area which is considerably larger than the area of the burn-spot, which permits the use of correspondingly weaker light sources.

c) Oblique recording and reading permit directed data accessibility and increase data security:

The reading equipment must be adapted to the same angles ($\Theta_i$, $\phi_j$) which were defined during recording. It is fully possible to supply different user groups with equipment which only can read at some of the angles, but not all of which were used during recording. The angles which are not accessible for a certain user group can, for example, store information which only is meant to be read by other user groups.

The angles ($\Theta_i$, $\phi_j$) need not be defined before recording. Thus, completely manufactured media can be delivered from factories and thereafter can be used for recording at userspecified sets of angles. Reading is thereafter only possible by applying the same angles. This represents a certain protection against reading with "pirate equipment".

d) The medium is well suited for data-reading by transmission:

The task of easy establishing of optical guide marks can probably be solved by illuminating the data storage medium in such a manner that burn-spots only are created where optical structures are located which have focused the light. Furthermore, less stringent requirements for focusing and imaging see a) herein above) means that the relatively large optical path lengths through the data storage medium, which must be expected during reading with transmission, can be tolerated.

A considerable advantage in using transmission instead of reflection consists in the large freedom of choice of the burn-film. It no longer needs to possess a controlled reflection ability, but can independently thereof be optimized with respect to burn-threshold, stability and production costs. Further, possibilities arise to use films with special properties, for example reversible burn-films, fluorescent dyes which are bleached in the burn-spot area during recording, or dyes which only can be recorded or read at one or more defined wave lengths.

A potentially important advantage with transmission is that double refraction in the data storage medium, which was mentioned earlier as a problem, has little or no importance.

e) Simple and fast reading:

Because of their special properties, data storage media with spheres can be used in new types of reading equipment based on extended surface illumination of the medium (i.e. not laser scanning) combined with imaging in a detection system which, for example, can be an electronically scanned matrix which contains a large number of single detector elements, as discussed below. Such reading systems can be very simple and compact, and allow parallel reading from several areas on the data storage medium simultaneously. When employing large detector matrices, etc. it becomes possible to achieve high reading speed and short "random access" time (today's data storage systems have the disadvantage of slow random access due to the need for mechanical movement of the laser, the data storage system and/or the optics, during reading).

It is no trivial task to manufacture a data storage medium according to the invention, for example of the types with transparent spheres as optical structures. The spheres have to be placed as a monolayer onto the burn-film itself or at a small well defined distance therefrom. They have thereafter to be fastened and protected. In practice the spheres must probably also be positioned with high precision in a predefined pattern.

Several techniques for controlled positioning can be of interest, as discussed below. So far a results from practical tests suggest that it will be possible to achieve good technical solutions of the problem concerning positioning of the spheres.

One might expect that focusing microstructures, e.g. hemispheric elevations which are stamped into a transparent layer over the burn-film, can replace the spheres. In analogy with production processes for compact discs (CD), for example, such structures could be stamped in large numbers by means of a master. Closer studies show, however, that the use of stamped or pressed structures require that certain non-trivial problems be solved, cf. below.

Factors favoring the sphere solution compared to stamped or pressed structures are partly connected with focusing and partly with the energy situation during recording of data;

The number of recording directions ($\Theta_i$, $\phi_j$) which can be assigned to each focusing element, N, is an essential factor. A high N implies strict requirements on the shape of the focusing element and its surface quality. More important here is probably the small distance tolerances ($\mu$m or less) between the focusing element and burn-film, which have to be observed over macroscopic distances (some cm). If stamping or pressing is applied to a transparent layer on top of the burn-film, which itself is mounted on a plastic material, it may prove difficult to achieve a correct distance to the burn-film over the whole data storage medium in practice. In addition, the burn-film must not be locally deformed during stamping/pressing, even if the structure to be made (e.g. hemisphere) has a profile height which is comparable with the distance to the burn-film.

When spheres are used, however, it is relatively easy to achieve full control of the focal conditions, provided that the spheres are monodisperse and have small deviations from perfect spherical shape.

In general, it is desireable to employ the lowest possible power/energy per recorded data bit. The focal distance of a stamped/pressed hemispheric area is about twice as large as of a sphere of corresponding size, and the burn-spot area about four times larger. To a first approximation the sphere alternative is more advantageous by a factor of 4. This situation is further improved by a factor of about 2, because burn-films which are related to stamped/pressed focusing structures are in contact with solid material on both sides, while sphere-based data storage media typically have air on one side of the burn-film and solid material on the other. In sum, this means that data storage media with stamped/pressed focusing elements require more power/energy for recording than media with spheres. In addition to dimensioning the recording laser, this can be of importance for achieving the smallest possible size of the burn-spot, the fastest possible recording of each bit etc. (the "damage" process in the burn-film during reading can be highly non-linear with respect to energy or power density).

To illustrate the practical feasibility of the invention, describe below are embodiments where critical features have been verified in practical tests.

On the surface of a transparent substrate 5 consisting of, e.g. polycarbonate, a pitted pattern is stamped/pressed with a die (a "master"). In analogy to the process for the production of compact discs [CD-records], the master can be produced by means of photolithography, followed by vacuum deposition, followed by electrolytic coating. Also the stamping/pressing-process itself can be performed in analogy to CD production, where large scale production techniques have reached an advanced stage of development.

Figure 10A:
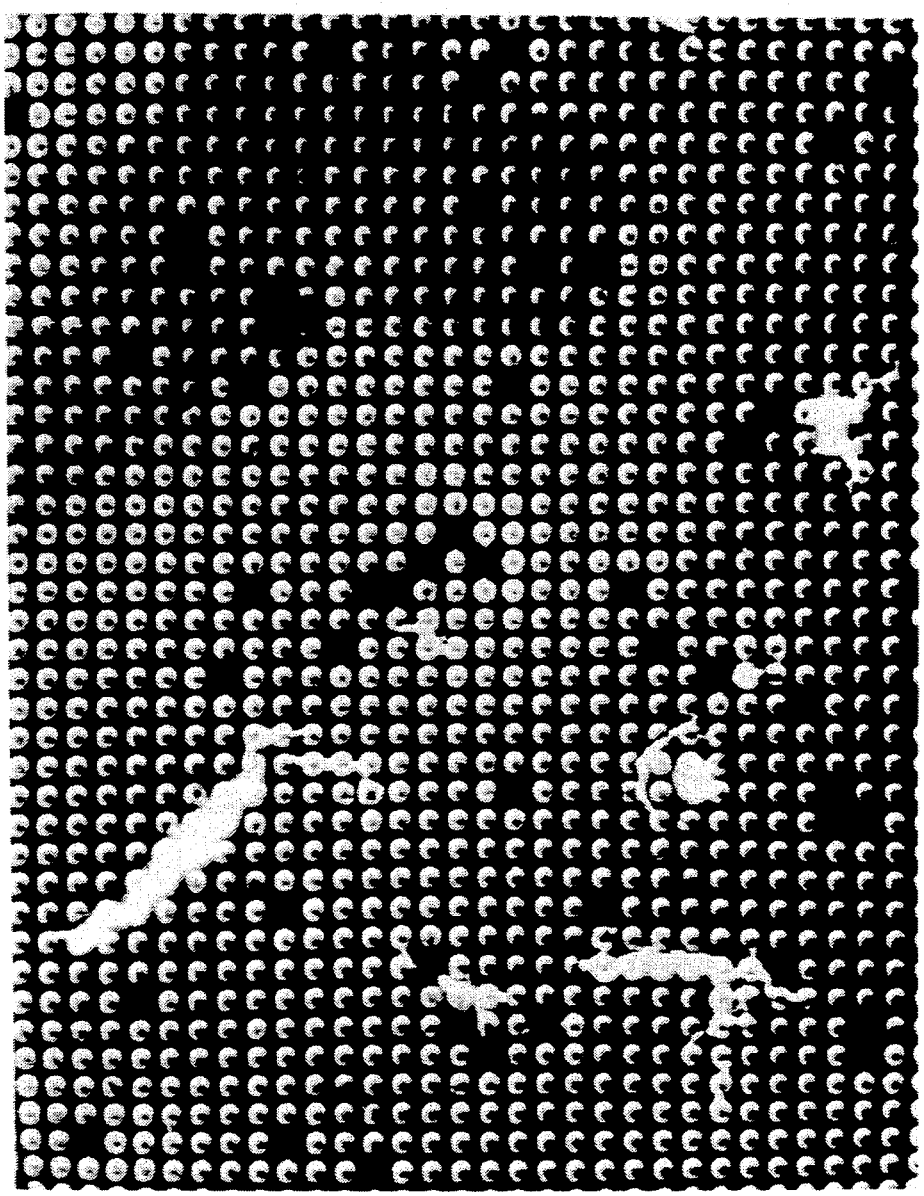
FIG. 10A shows the experimental result of simple trickling of spheres onto a pre-pitted substrate.
Figure 10B:
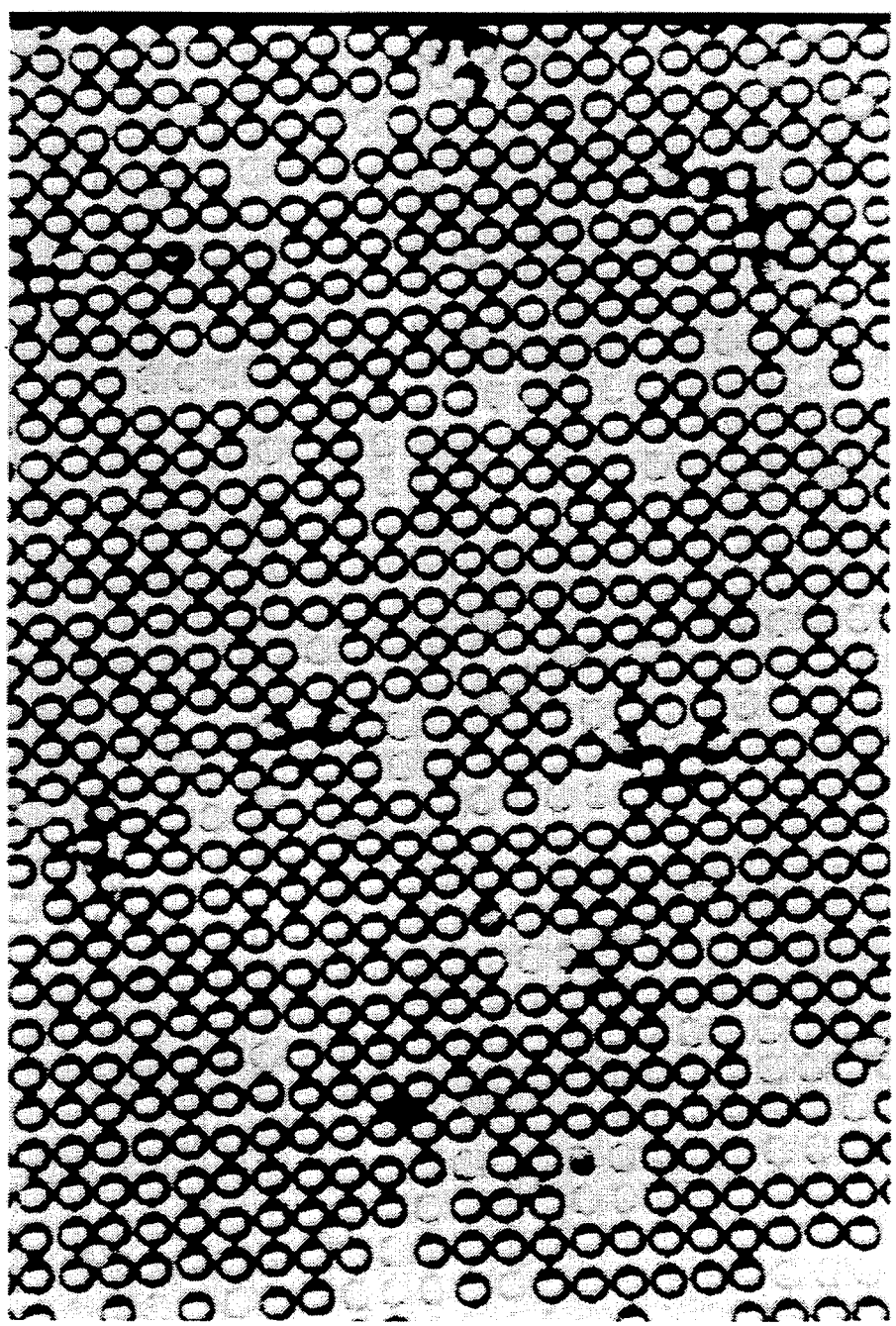
FIG. 10B shows the corresponding results after deposition by means of dry brushing.

After the pits 22 have been stamped/pressed into the substrate 5, a burn-film 4 is applied onto the stamped/pressed surface. This can, for example, be done by depositing tellurium under vacuum, whereby an even, opaque layer on the bottom of each pit 22 is obtained. One sphere 10 is placed in each pit 22 by trickling from the liquid phase or by dry brush application. This is a non-trivial task which, however, shall not be discussed any further here. Suffice it to state here that tests made until now, show practical feasibility: Substrates with pits of 1-2 $\mu$m in depth and a diameter in the range of 2-15 $\mu$m have been photolithographically manufactured. FIG. 10A shows spheres with a diameter of 7.1 $\mu$m which were deposited by means of trickling from the liquid phase to a matrix of pits, each with a diameter of about 5 $\mu$m. Despite the simple non-optimized process, a high degree of filling of the pits was achieved i.e. 97% of all pits were filed. A corresponding result was obtained by the dry brush method, see FIG. 10B, which shows spheres with a diameter of 6.4 $\mu$m of the same pitted pattern.

Figure 11A:
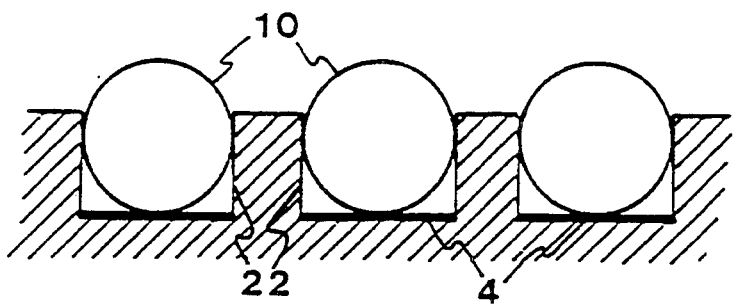
FIG. 11A–11C illustrate various methods for deposition of transparent spheres into pits on a substrate.
Figure 11B:
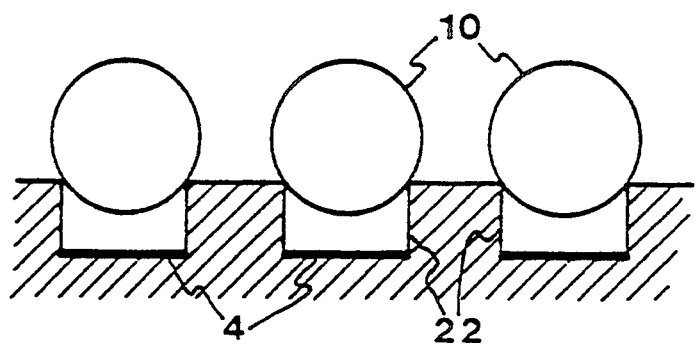
Figure 11C:
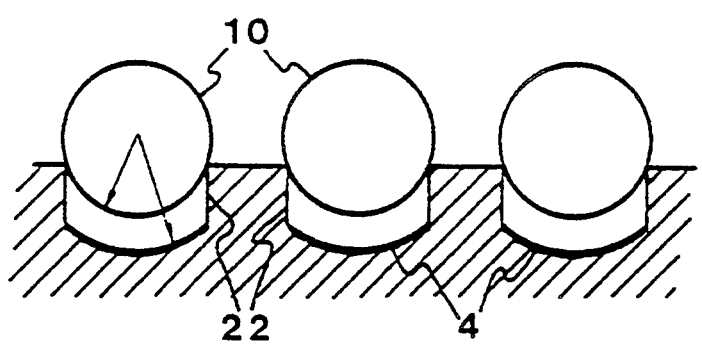

Data storage media with pits can be manufactured on several levels of sophistication. FIG. 11A shows the simple case where the spheres 10 are in the pits 22, directly on the burn-layer 4. In FIG. 11B the pit diameter is adapted to the size of the sphere, such that the latter is kept in the optimal focusing distance relative to the burn-layer 4 at the bottom of the pit 22. This requires use of monodisperse spheres. In FIG. 11C the bottom of the pit 22 is shaped like a part of a spherical surface, concentric with the sphere 10. Thereby ideal focusing on the burn-layer 4 is achieved for all angles of incidence, as well as perfect retro-reflex for systems based on reading with reflection.

Figure 12:
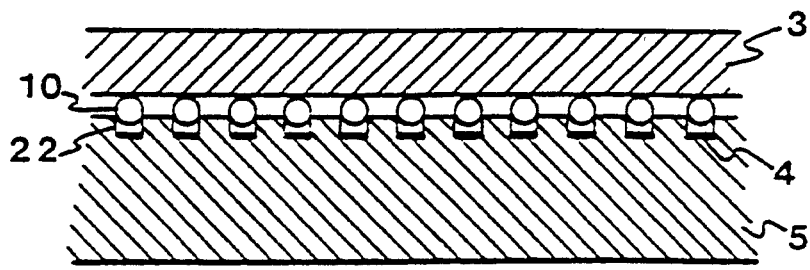
FIG. 12 shows one example of a complete data storage medium with transparent spheres in pits.

After deposition of the spheres 10, the medium is encapsulated with a protective film 3 of, e.g. transparent polycarbonate, see FIG. 12. A relevant total thickness of the memory medium is 0.8 mm, an ISO-standard for credit cards. Oblique recording does in practice not necessarily imply large technical complication. A simple technique, which permits illumination of one and the same sphere 10 from many directions without readjustment of the light beam in each direction is shown in FIG. 13:

All incident beams 1a, 1b, that are parallel with each other, will, after having passed through the illumination optics 15, be refracted in such a manner that they strike the same point (the sphere center) from different directions. Only a fraction of the illumination optics aperture is used for each direction. This is achieved by having a laser beam 1 with limited diameter strike different positions on the aperture, depending on the desired light direction towards the sphere 10.

Alternatively, partial screening of the fully illuminated aperture can be applied. In both cases it is possible to choose the direction without mechanical movement of components (not discussed further here).

Figure 13:
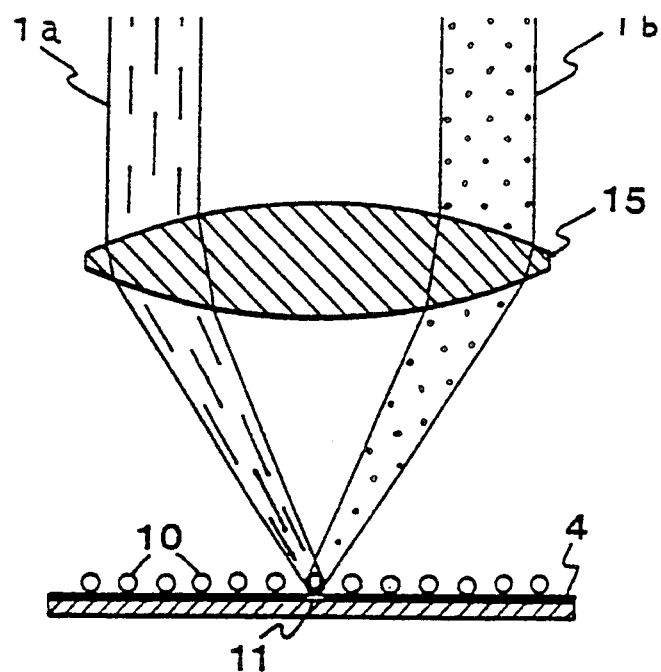
FIG. 13 illustrates the possibility of recording through one single sphere from several directions by screening or parallel displacement of the light beam at the entrance to the optical system.

The principle solution of FIG. 13 requires a reasonable choice of parameters and components, where the f-number and aperture of the optics are adapted to the sphere diameter, illumination angles and their tolerance. Again it turns out that large spheres make it easier to find practical solutions.

With respect to reading with directional illumination, one of the techniques which was mentioned above in connection with reading under light transmission shall be discussed.

Figure 9A:
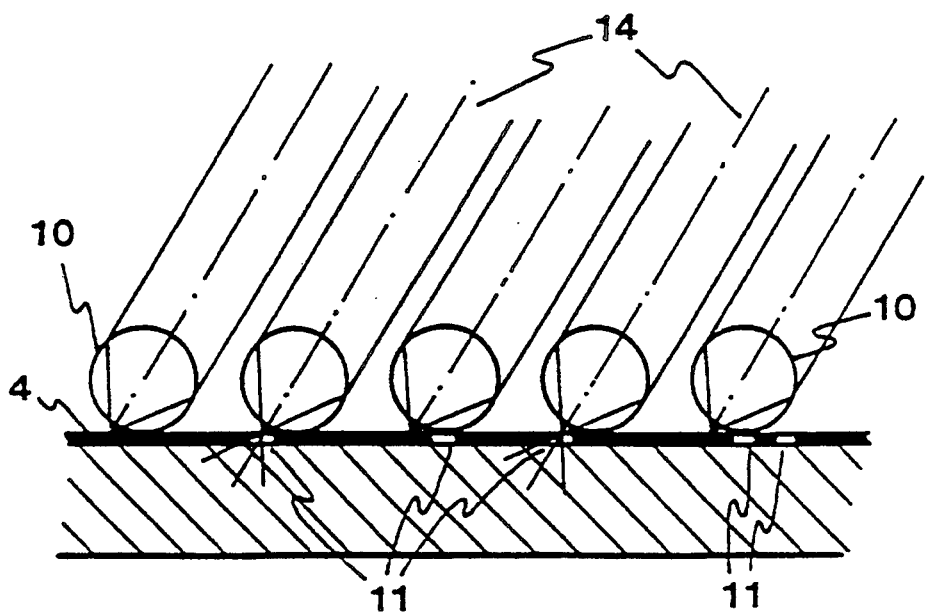
FIG. 9A shows an alternative reading method applying directional light from the top side of the medium.
Figure 9B:
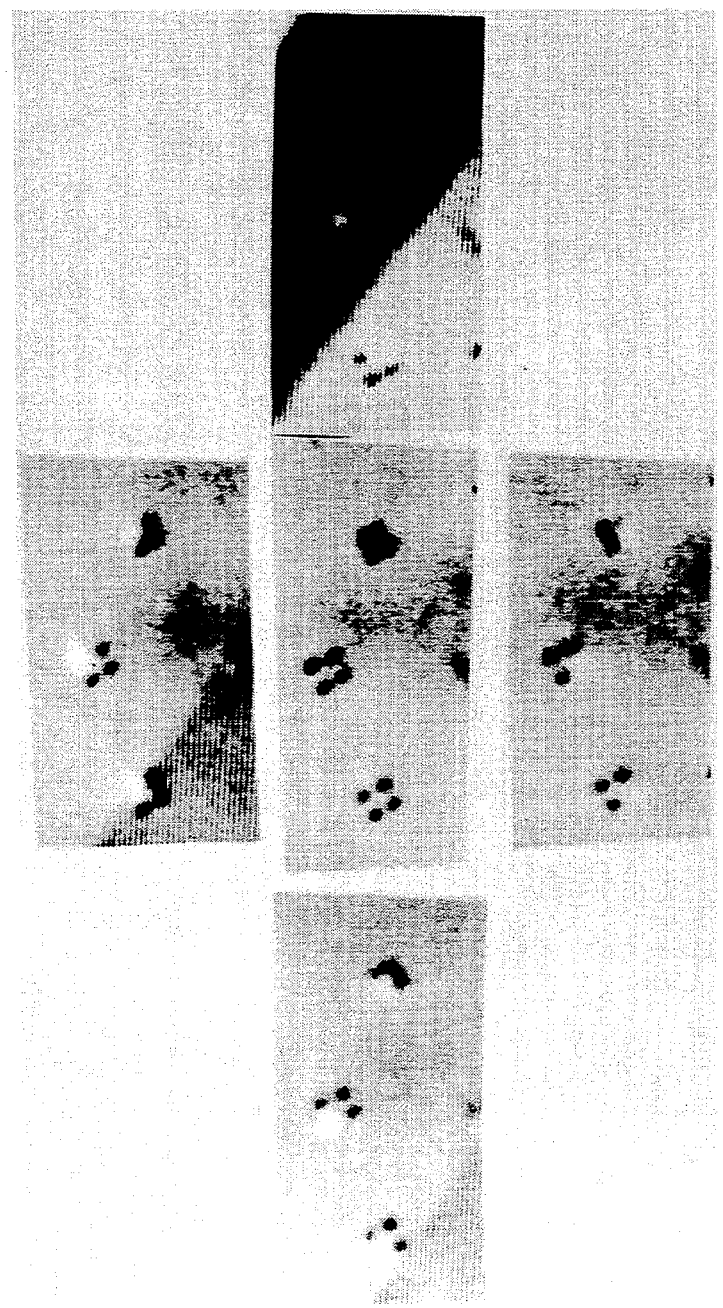
FIG. 9B shows images taken from the bottom side of the medium, for various directions of light incident on the top side.
Figure 14A:
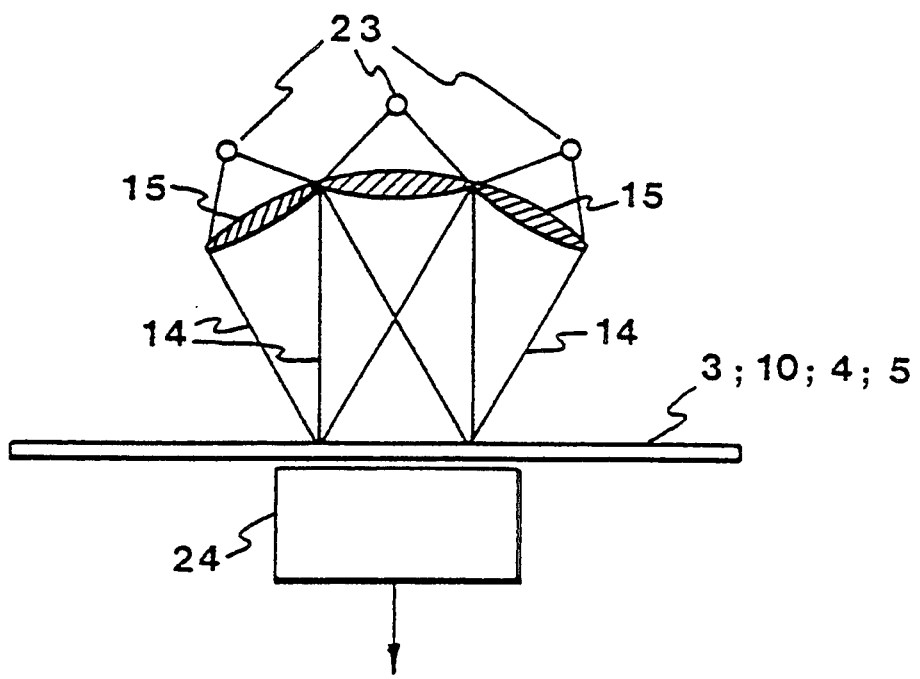
FIG. 14A is a schematic drawing showing an arrangement for reading with directional light.

A simple light source such as a LED 23 illuminates the data storage medium from a direction ($\Theta_i$, $\phi_j$) which corresponds to one of the reading angles, see FIG. 9A, 9B and 14A. A large area on the medium with many spheres is illuminated simultaneously from that side of the burn-film where the spheres are placed. The light 14 has almost plane-wave-character at each single sphere 10, and the focusing in the sphere deviates little from that during the preceding recording with the laser beam. After focusing in the sphere 10, the light will pass through the burn-film 4, provided a burn-spot 11 (a "hole") had previously been created in that direction during the recording of data.

Figure 14B:
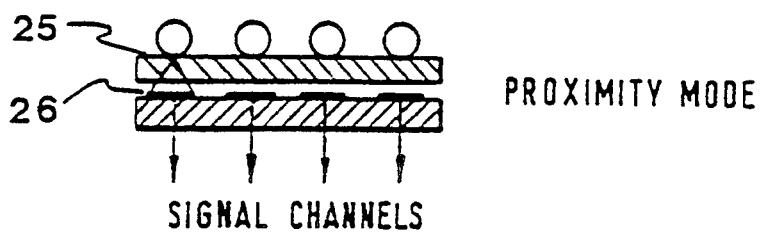
FIG. 14B–14D show examples of detector systems for use in the arrangement of FIG. 14 A.
Figure 14C:
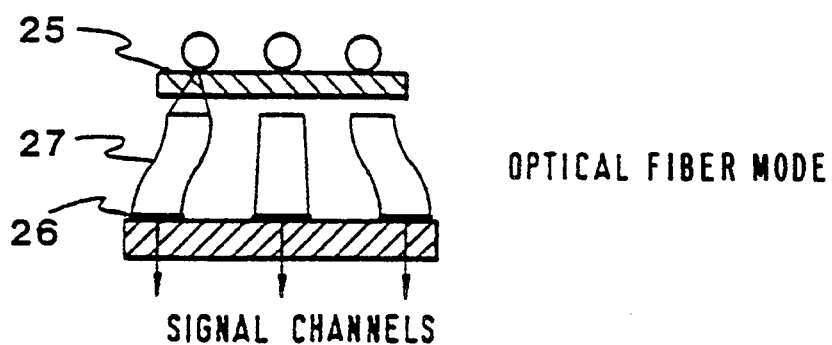
Figure 14D:
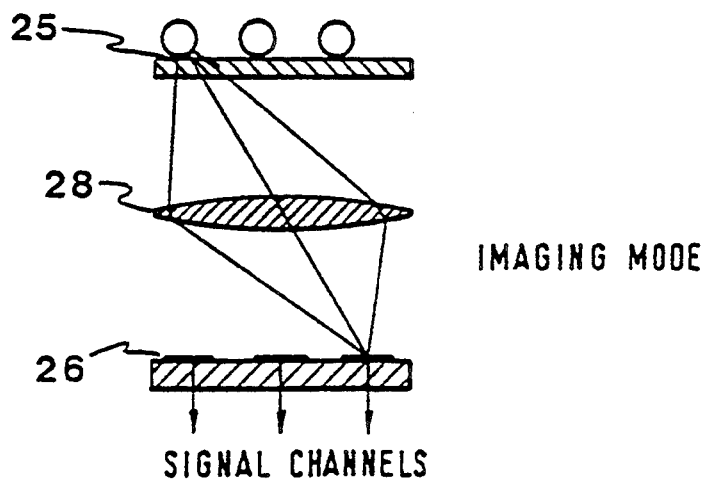

Light that passes through the holes 11 in the burn-film 4 is recorded by means of a simple optical system 24 which does not need to resolve each hole. Since the direction ($\Theta_i$, $\phi_j$) under which the illumination takes place is already known, it is sufficient to determine at which sphere positions (x, y) light is transmitted. This can be done, for example, by means of a detector matrix with one or more detector elements 26, assigned to each sphere position in the medium 25 by "proximity" (FIG. 14B), optical fiber 27 (FIG. 14C) or imaging optics 28 (FIG. 14D).

The number of detector elements 26 per matrix can be large (CCD-matrices for TV cameras contain several hundred thousand elements). Thereby correspondingly large blocks of the data storage medium can be read quickly by electronic scanning, and the whole medium can be covered by a small number of mechanical displacements. Intermediate solutions are conceivable. An alternative to large detector matrices which "stare" are, for example, detector arrays which scan. If the medium is not too broad (e.g. tape) the matrix can cover the whole width of the medium. Mechanical displacement can in that case be obtained by pulling the medium in one direction, preferably continously. Large matrices, however, place more stringent requirements on the reading system and data storage medium, and it becomes e.g. more difficult to achieve register between the sphere's position and the assigned detector element for all sphere positions in the block. In this connection, the data storage system according to the invention offers special advantages. It is considerably easier to achieve register with a lower number of relatively large focusing structures (spheres), than with a larger number of smaller data spots in a traditional optical data storage medium. Indeed, simple imaging analysis shows that in many relevant cases, there is a dichotomy where the one solution is practically achievable while the other is not. Solutions based on redundancy (several detector elements assigned to each focusing structure or burn-spot on the data storage medium), or fast-scan near nominal positions will hardly change this fundamental situation.

After illumination in a given direction ($\Theta_i$, $\phi_j$) this LED 23 can be turned off, and another LED 23 is turned on, which provides reading in a new direction ($\Theta_k$, $\phi_l$), etc. until all directions in question have been covered. This can be done in a very fast sequence, while the data storage medium is immobile during the illumination cycle. In practice light sources 23 can be used which switch on and off at such a rate that the relative displacement between the medium and the reading equipment during the illumination cycle is negligible, even at relative speeds up to many m/s.

By employing mutually spectrally adapted light source/detector element pairs, possibilities arise for simultaneous parallel reading of data in several directions.

It is evident that reading equipment in many subcategories can easily be manufactured, where each category only has illumination possibilities in a smaller number of reading directions (see paragraph C above concerning control of data accessibility).

Finally it should be remarked that, even if the data storage technique, which is the essential feature in the present invention, concerns in principle visually non-readable data spots which are read and interpreted independently, there is actually no hindrance to achieve additional indications which also are visible to the eye, by using the same technique. In the latter case, visible features are produced through correlation of data points in macroscopic areas to create visible images by "cooperation". Such images can be visible from all, or only a limited number of directions.

Of course, a practical data storage medium (card) can be additionally equipped with visual indications which are created by printing.

I claim:

1. An optical data storage medium for the storage of data in a number of elementary cells in the form of groups of localized areas, said medium comprising:
    a light absorbing burn-film having the capability of having optical properties thereof changed under the influence of strong localized illumination by light, to thereby enable recording of data on said medium;
    optical structures, positioned in close proximity to said burn-film and constituting an integral part of said medium, for regulating refractive or reflective influence of illumination toward said burn-film;
    each said optical structure having a configuration enabling light from illumination of said medium from different directions to strike said burn-film in a respective said group of said localized areas;
    each said optical structure having maximum dimensions, in all directions parallel to said burn film, less than 100 $\mu$m; and
    each said group and each said area having the capability of receiving data lacking inherent correlation to data in neighboring groups or areas, and each said group and each said area being capable of being read and interpreted individually.

2. A medium as claimed in claim 1, wherein each said maximum dimension is 3-10 $\mu$m.

3. A medium as claimed in claim 1, wherein said optical properties of said burn-film are changeable reversibly.

4. A medium as claimed in claim 1, wherein said optical properties of said burn-film are changeable irreversibly.

5. A medium as claimed in claim 1, further comprising a light transparent film on a side of said burn-film from which said medium is illuminated, and said optical structures comprise structural variations in said light transparent film.

6. A medium as claimed in claim 5, wherein said structural variations comprise discrete elements fixed in relation to said burn-film.

7. A medium as claimed in claim 5, wherein said variations comprise surface patterns formed in said transparent film.

8. A medium as claimed in claim 5, wherein said variations comprise modifications of the refractive index of the material of said transparent film.

9. A medium as claimed in claim 1 wherein said burn-film is partly transparent to illumination, and said optical structures comprise surface variations in a light reflective structure spaced from said burn-film on a side thereof opposite to the side from which said medium is illuminated.

10. A medium as claimed in claim 1, wherein said optical structures have the capability of concentrating or focusing incident light beams on said burn-film.

11. A medium as claimed in claim 1, wherein said optical structures comprise a plurality of separate light transmitting optically refracting objects.

12. A medium as claimed in claim 11, wherein said refracting objects comprise spheres.

13. A medium as claimed in claim 12, wherein said spheres have substantially the same diameter and bulk properties.

14. A medium as claimed in claim 12, wherein said spheres are in contact with said burn-film.

15. A medium as claimed in claim 12, further comprising a substrate having formed therein a plurality of depressions, said burn-film covering bottoms of said depressions, and said spheres being located at least partially in respective said depressions.

16. A medium as claimed in claim 15, wherein said depressions have dimensions correlated to the diameter of said spheres to achieve optimum focusing of light through said spheres on said burn-film.

17. A medium as claimed in claim 15, wherein said bottom of each said depression and said burn-film covering said bottom are shaped concentrically of the respective said sphere.

18. A medium as claimed in claim 15, wherein said bottom of each said depression and said burn-film covering said bottom are planar.

19. A medium as claimed in claim 12, wherein said maximum dimension comprises the diameter of said sphere.

20. A medium as claimed in claim 19, wherein said diameter is 3–10 µm.

21. A medium as claimed in claim 1, wherein at least one said localized area of each said group comprises a marker area at a predetermined location as a result of intense pre-illumination thereof via said optical structures, thus providing guidance for subsequent recording of data on and reading of data from said medium.

22. A medium as claimed in claim 21, wherein said predetermined location is positioned centrally of a respective said optical structure.

23. A method of recording data on an optical data storage medium including a light absorbing burn-film having the capability of having optical properties thereof changed under the influence of strong localized illumination by light, and optical structures positioned in close proximity to said burn-film and constituting an integral part of said medium, said method comprising:
selectively directing intense illumination toward each respective said optical structure from a number of different directions; and
causing each said illuminated optical structure to direct light onto said burn-film in a respective number of localized areas, and thereby changing the optical properties of said burn-film at said localized areas, each localized area thereby being imparted a digital information bit status to provide a storage content in said medium which is correspondingly retrievable bit by bit.

24. A method as claimed in claim 23, wherein said selectively directing comprises passing a broad light beam to an optical focusing system, and selectively blocking portions of said broad light beam from passing through said focusing system, such that only portions of said broad light beam are directed toward selected said optical structures.

25. A method as claimed in claim 23, wherein said selectively directing comprises exciting only selected separate light sources and directing light beams from said selected light sources through an optical focusing system toward selected said optical structures.

26. A method as claimed in claim 23, comprising illuminating said optical structures through a mask, allowing light to pass through only to selected of said optical structures.

27. A method of reading data from an optical data storage medium including a light absorbing burn-film having recorded thereon data in the form of groups of localized areas of changed optical properties, and optical structures positioned in close proximity to said burn-film and constituting an integral part of said medium, said method comprising determining positions of said localized areas by:
supplying diffuse illumination to said medium, such that light emerges from said optical structures in separate predefined directions as a function of positions of said localized areas;
passing said light through an optical transforming system positioned outside of said medium;
spatial filtering of the thus transformed said light at a plane spaced from said system; and
imaging of said medium in a focal plane of said system.

28. A method of reading data from an optical data storage medium including a light absorbing burn-film having recorded thereon data in the form of groups of localized areas of changed optical properties, and optical structures positioned in close proximity to said burn-film and constituting an integral part of said medium, said method comprising determining positions of said localized areas by:
illuminating said medium from selected predetermined directions, such that light emerges from said optical structures as a function of positions of said localized areas; and
detecting said emerging light for each said direction.

29. A method as claimed in claim 28, wherein said emerging light is detected by means of a linear array of detectors.

30. A method as claimed in claim 28, wherein said emerging light is detected by means of a two-dimensional matrix of detectors.

31. A method as claimed in claim 28, wherein said emerging light is detected by means of at least one light detector of the charge-coupled device (CCD) type.

* * * * *